United States Patent
Li-Calso

[11] Patent Number: 5,863,071
[45] Date of Patent: Jan. 26, 1999

[54] SEAT BELT ANCHOR DEVICE FOR AN AUTOMOBILE

[75] Inventor: Sharon Li-Calso, Bloomfield, Mich.

[73] Assignee: Nissan Research & Development, Inc., Farmington Hills, Mich.

[21] Appl. No.: 57,175

[22] Filed: Apr. 8, 1998

[51] Int. Cl.[6] .................................................. B60R 22/28
[52] U.S. Cl. .................................. 280/801.1; 280/801.1; 280/805; 280/808; 280/748; 280/751; 297/482
[58] Field of Search .............................. 280/801.1, 801.2, 280/805, 808, 798, 751; 297/468, 482, 483, 464, 470, 471, 486

[56] References Cited

U.S. PATENT DOCUMENTS

| | | |
|---|---|---|
| 4,181,359 | 1/1980 | Ward . |
| 4,645,232 | 2/1987 | Hamada et al. . |
| 4,955,639 | 9/1990 | Yamamoto . |
| 5,306,066 | 4/1994 | Saathoff . |
| 5,529,344 | 6/1996 | Yasui et al. . |
| 5,685,566 | 11/1997 | Hirase et al. .................. 280/801.1 |

*Primary Examiner*—Eric D. Culbreth
*Attorney, Agent, or Firm*—Brooks & Kushman P.C.

[57] ABSTRACT

A protective D-ring cover for a seat belt anchor for use in the passenger compartment of an automotive vehicle, the seat belt anchor including an anchor bolt secured to an upper portion of a structural pillar on a lateral side of the passenger compartment and a D-ring seat belt support carried by the anchor bolt as part of a three-point attachment to the body structure of the vehicle passenger compartment, the cover including a housing, first and second concentric structural circular ribs within the housing, a first pair of radial ribs between the circular ribs and a second pair of radial ribs between the outermost circular rib and the housing, the ribs being strategically located to absorb high energy impact forces that are offset relative to the anchor bolt.

5 Claims, 7 Drawing Sheets

| Bar No. | Countermeasure | Impact Angle H/V(deg.) | Reduction from w clip |
|---|---|---|---|
| 1 | Baseline | 1. Baseline 90/10 | - |
| 2 | w clips | 2. W Clip 90/3 | - |
| 3 | Plastic Ribbing | 3. Angle 90/3 | 25% |
| 4 | Plastic Ribbing | 4. Angle 90/-3 | 29% |
| 5 | Plastic Ribbing | 5. Angle 90/4 | 28% |
| 6 | Plastic Ribbing | 6. Angle 90/-3 | 31% |
| 7 | Plastic Ribbing | 7. Angle 80/-3 | 22% |
| 8 | Plastic Ribbing | 8. Angle 70/-3 | 27% |
| 9 | Plastic Ribbing | 9. Angle 52/-10 | 41% |

# SEAT BELT ANCHOR DEVICE FOR AN AUTOMOBILE

TECHNICAL FIELD

The invention relates to three-point passenger restraint belts for use in a vehicle passenger compartment.

BACKGROUND ART

Active restraint systems for automobile vehicle passengers include three-point seat belt restraints that are integrated with each vehicle passenger seat. One end of the seat belt typically is fastened to a side pillar anchor point on one side of the passenger compartment by means of a belt retraction assembly. The other end of the seat belt typically is secured fast to the vehicle body structure by a permanent anchor bolt. The intermediate portion of the seat belt is trained through a D-ring, which in turn is secured typically to an upper portion of the structural side pillar of the automotive vehicle body. The intermediate portion is adapted to be buckled to a third anchor member on the floor pan of the passenger compartment. This permits the seat belt to be trained over the front torso of a belted passenger as well as over the pelvic region. Examples of such three-point type seat belt restraint systems can be seen by referring to U.S. Pat. Nos. 4,645,232, 4,955,639 and 5,529,344. These patents are representative of the existing state of the art.

A three-point seat belt anchorage of this kind makes it necessary for an anchor bolt for the D-ring, through which the seat belt is trained, to be located at an upper location on the structural side pillar of the automotive body in rather close proximity to the head of a belted passenger. Because of this three-point seat belt restraint geometry, it is beneficial to provide enhanced protection for the vehicle occupant against head injuries caused by high-energy impact forces to which the vehicle body may be subjected during accidents on the roadway.

It is known design practice to provide for energy absorption of impact forces that might be applied to the seat belt anchorage at the upper portion of the structural side pillar of an automotive vehicle passenger compartment when the impact force is in the direction of the axis of the anchor bolt for the seat belt D-ring. An example of such an energy-absorbing device is shown in U.S. Pat. No. 5,529,344 where a metallic bellows is situated between the seat belt D-ring and a structural side member of the vehicle body. When an axial load is applied to the seat belt anchor, the metallic bellows will be crushed, thereby absorbing the kinetic energy of the impact force applied to the head of the bolt.

It is known design practice also to provide a protective cover for an anchor bolt at the upper portion of the structural pillar of an automotive vehicle body wherein the protective cover includes a deformable metal clip having a "W" shaped cross-section. The clip is engageable with the head of the anchor bolt. An impact force applied in the direction of the axis of the bolt will deform the clip, thus reducing the peak impact force applied to the anchor bolt.

SUMMARY OF THE INVENTION

The invention comprises a protective cover for the overhead anchor bolt for a three-point seat belt anchorage in an automobile passenger compartment. It comprises a cover having deformable ribs that absorb the energy of impact forces. One deformable rib engages directly the head of the bolt and a companion deformable rib surrounds the head of the bolt. Strategically positioned radial, structural, deformable ribs are disposed between the outer surface of the first deformable rib, which is located within the surrounding outer deformable rib. A second set of strategically positioned radial, structural, deformable ribs is situated between the outer margin of the outermost deformable rib and the body of the cover itself, the latter also acting as an energy-absorbing structural member.

The deformable circular ribs and the deformable radial ribs are arranged to absorb energy of an impact force having an effective force vector that is angularly offset from the axis of the bolt, thereby providing enhanced protection for a vehicle seat occupant in non-axial directions of impact of a high-energy force on the seat belt anchorage.

Provision of a protective cover for the mid-location of a seat belt in a three-point anchorage system that will effectively absorb the energy of an offset impact force being a principal objective of the invention, it is another objective of the invention to provide a protective cover that easily may be manufactured as a unitary part with a simplified molding technique, thereby simplifying the manufacturing steps and the assembly procedure.

BRIEF DESCRIPTION OF THE DRAWINGS

FIG. 6a is a schematic view showing the coordinates used in documenting the impact forces shown in FIG. 5a.

PARTICULAR DESCRIPTION OF THE INVENTION

Figure 1:
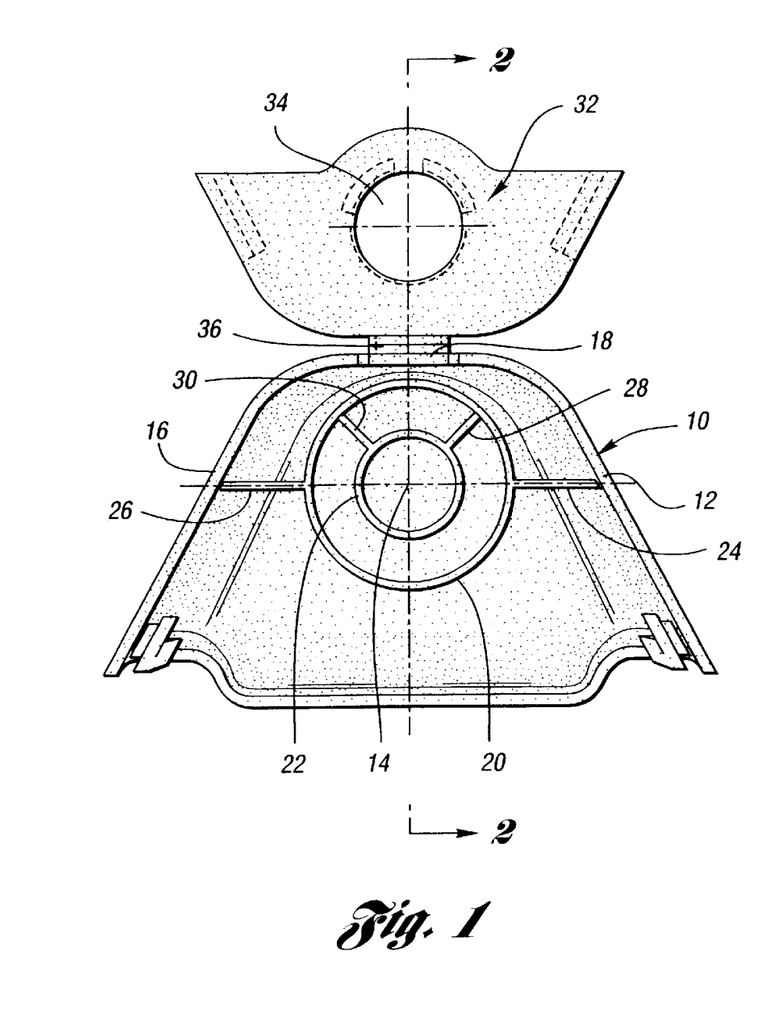
FIG. 1 is an end view of the cover assembly of the invention.
Figure 2:
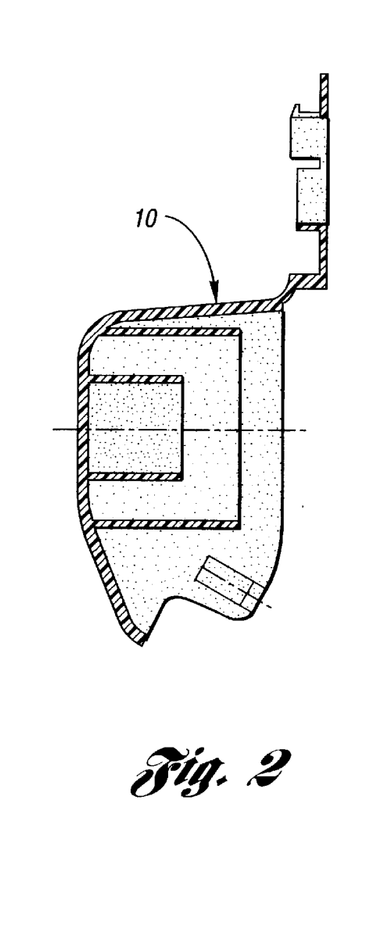
FIG. 2 is a transverse cross-sectional view taken along the plane of section line 2—2 of FIG. 1.

A protective cover that embodies features of the invention is shown in FIGS. 1 and 2 at 10. It includes a housing having a first side portion 12 located on one side of an anchor bolt axis 14, a second side portion 16 located on the opposite side of the axis 14, and a top portion 18. The housing portions 12, 16 and 18 form a unitary, molded shroud that surrounds an anchor bolt located on the axis 14. The anchor bolt will be described with reference to FIG. 7.

Located within the housing portions 12, 16 and 18 is a circular rib 20 surrounding the anchor bolt axis 14. The rib 20, as best seen in FIG. 2, extends approximately 75–80 percent of the depth of the outer housing members. Located within the rib 20 is a second circular rib 22 that surrounds the axis 14 and that is generally concentric with respect to the rib 20. As best seen in FIG. 2, the depth of the rib 22 extends about 50 percent of the depth of the housing members.

Figures 7, 8, 9:
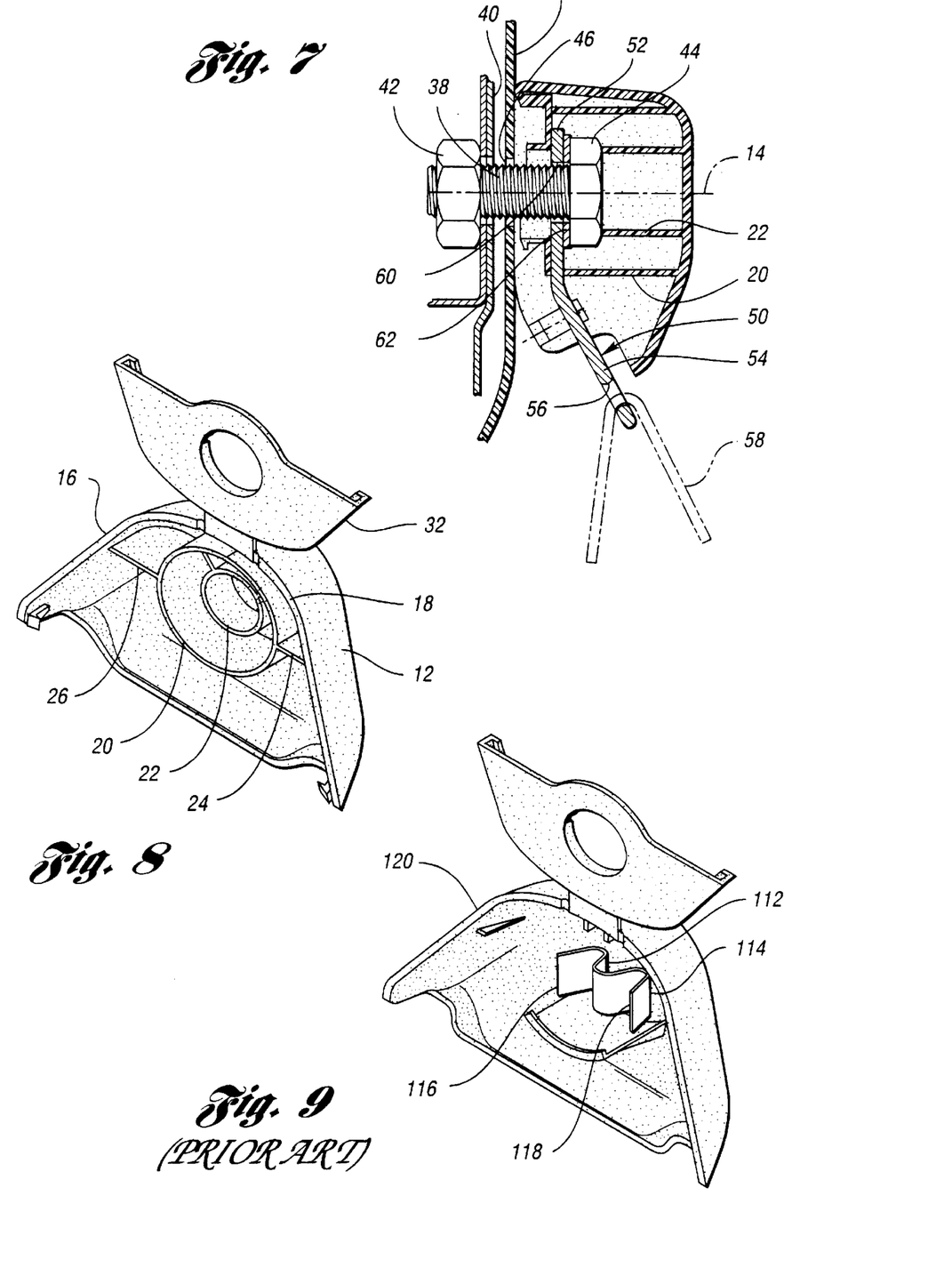
FIG. 7 is a cross-sectional view of the cover assembly of FIG. 1 together with an anchor bolt and structural side panel that forms a part of the vehicle side cover.
FIG. 8 is a perspective view of the cover assembly of the invention.
FIG. 9 is a perspective view of a cover, known in the prior art, which includes a W-shaped energy-absorbing steel clip situated adjacent the head of an anchor bolt.

As seen in FIGS. 1 and 8, a first radially extending rib 24 extends from the outer periphery of the rib 22 to the inner wall of the housing portion 12. A second radially extending rib 26 extends from the opposite side of the circular rib 20 to the housing portion 16. The radially extending ribs 24 and 26 are generally coplanar, the common plane containing the axis 14.

A second pair of radial ribs is shown at 28 and 30. These extend from the outer side of the circular rib 22 to the inner side of the circular rib 20. They are located in a plane that contains the axis 14 and are displaced approximately 45° and 135°, respectively, with respect to the horizontal plane of the ribs 24 and 26.

The housing portions 12, 16 and 18, the circular ribs 20 and 22, and the radially disposed ribs are molded, preferably from polypropylene structural plastic material, as a single piece.

The protective cover of the invention includes a closure wall 32 with a central opening 34 which is adapted to receive the anchor bolt, as will be described with reference to FIG. 7. The closure wall is hinged at 36 to the upper margin of the housing portion 18 by means of a plastic hinge that forms a part of the unitary molding of the protective cover.

As seen in FIG. 7, an anchor bolt 38 is secured to a structural panel 40 of the side pillar for the vehicle passenger compartment. The bolt 38 is threaded in an anchor nut 42. The head of the bolt, shown at 44, extends through a garnish panel 48 located directly adjacent the side pillar panel 40.

A D-ring support for a seat belt is shown generally at 50. It includes a planar portion 52 located directly adjacent the garnish 48 and an angular portion 54 that has an aperture 56 through which the seat belt 58 is trained.

As seen in FIG. 7, the circular rib 22 directly engages the head 44 of the bolt 38. The planar portion 52 of the D-ring 50 has an opening 60 through which the bolt 38 extends. If desired, a washer 62 may be positioned between the bolt head 44 and the planar portion 52 of the D-ring 50.

Figure 6A:
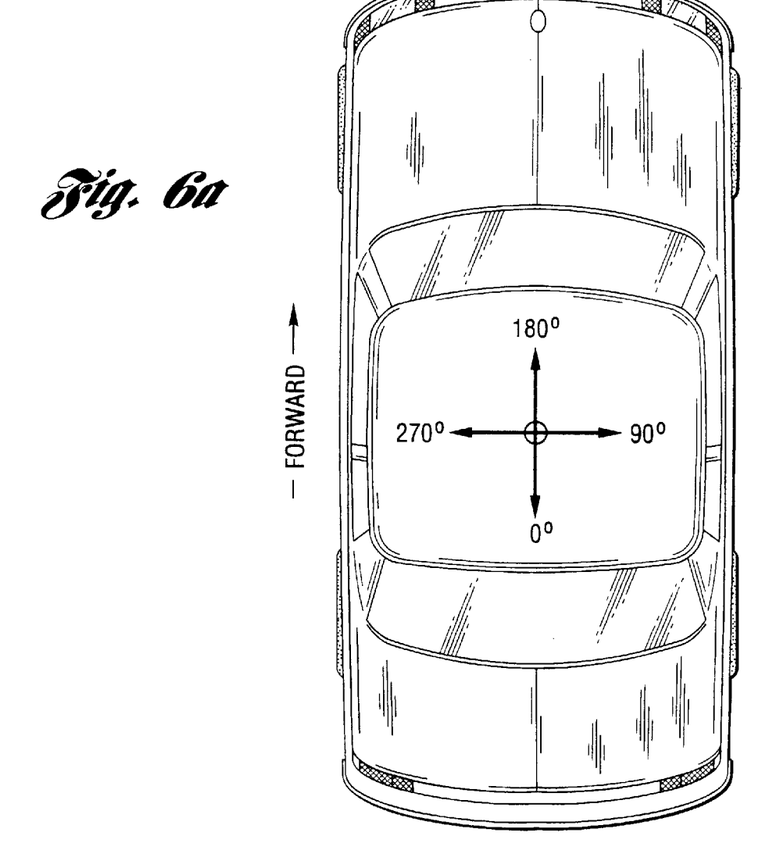
Figure 6B:
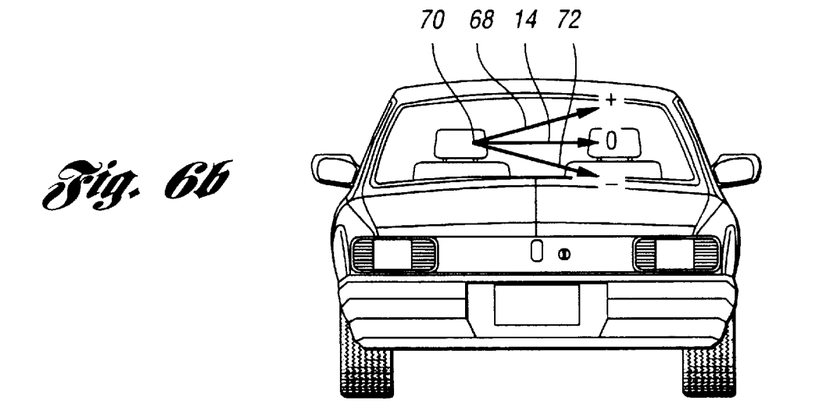
FIG. 6b is a rear view of a vehicle with the D-ring a anchorage of the invention together with typical traverse force vectors that are angularly offset from the direction of the axis of the anchor bolt.

In FIG. 6b, impact vectors involved when the head of a passenger strikes the anchor bolt are indicated by means of impact vectors. Vector 68 represents an impact vector that is offset +3° with respect to the axis of the bolt shown at 14. The point of impact on the bolt head is indicated in the diagram of FIG. 6 as the point of origin 70. Force vector 72 represents a force that is offset −3° relative to the axis 14.

The coordinates for identifying impact angles in a horizontal plane are shown in FIG. 6a. The horizontal plane of FIG. 6a would correspond to a top view of the anchor bolt. The 180° coordinate would represent the forward direction and the 0° coordinate would represent the rearward direction. A right side impact force in the plane of the axis 14 is represented by the 90° coordinate. A left side impact force in the plane of the axis 14 is represented by the 270° coordinate.

Figure 5:
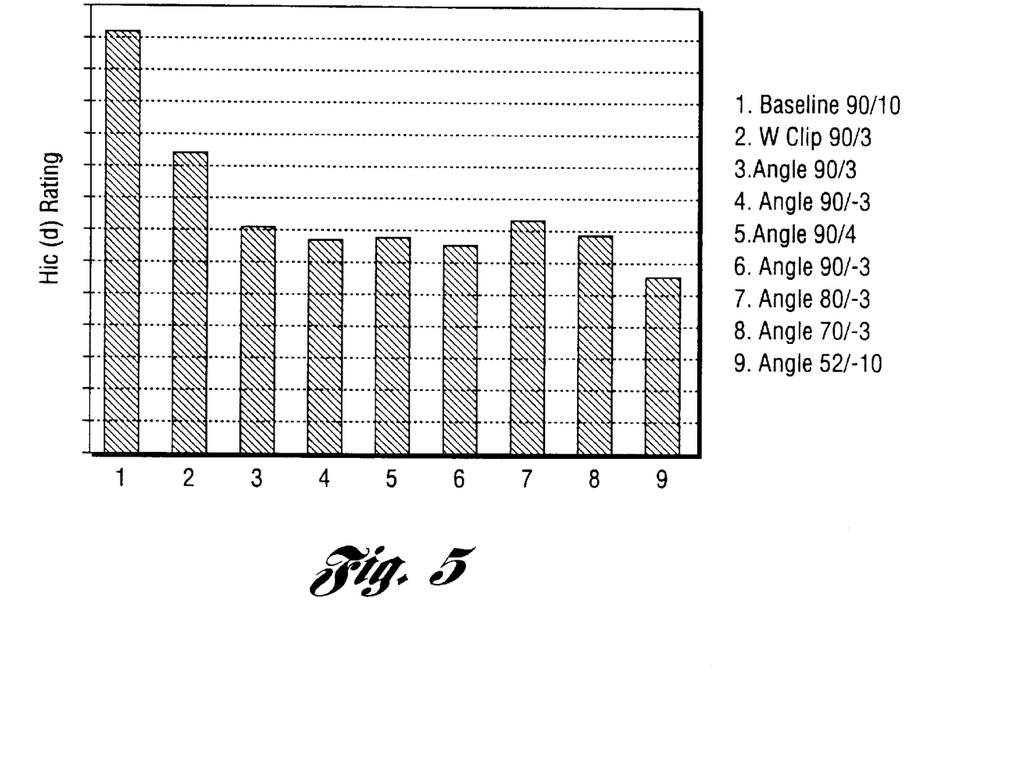
FIG. 5 is a chart showing head impact criteria plotted against angle of impact on test samples of the protective D-ring cover of the invention.

FIG. 5 shows a plot of head impact criteria factors [HIC(d)] for various impact angles. The performance criteria plotted on the ordinate of the graph of FIG. 5 are empirical numbers representing criteria established by the National Highway Traffic Safety Administration. A criterion, in accordance with the standards established by 49 CFR, Chapter 5, Section 571.201, should not exceed 1000 when calculated in accordance with the following formula:

$$HIC(d) = 0.75446 \times (\text{free motion headform } HIC) + 166.4,$$

where free motion headform HIC is calculated in accordance with the following formula:

$$HIC = \left[ \frac{1}{(t_2 - t_1)} \int_{t_1}^{t_2} a \, dt \right]^{2.5} (t_2 - t_1).$$

The term "a" in this formula is the resultant acceleration expressed as a multiple of "g" (the acceleration of gravity). The terms $t_1$ and $t_2$ are any two points in time during the impact which are separated by not more than a 36 millisecond time interval.

For purposes of comparison, FIG. 5 shows the base line value for the HIC(d) empirical number when the anchor bolt does not have a protective cover. That value is shown by Bar No. 1. Bar No. 2 shows the corresponding protective value for the HIC(d) number for a so-called prior art W-clip protective cover design, which will be described with respect to FIG. 9. That value is less than the base line value which assumes an impact force at 90° in the horizontal plane illustrated in FIG. 6a and 10° in the vertical plane illustrated in FIG. 6b. It also assumes there is no energy absorber. The W-clip protective cover data of Bar No. 2 for the prior art design of FIG. 9 assumes an impact force at 90° in a horizontal plane and at +3° in the vertical plane.

The bars in FIG. 5 identified by numbers 3, 4, 5, 6, 7, 8 and 9 represent performance criteria for the improved protective cover design of the present invention. In each instance, the HIC(d) value is substantially less than the base line value. The force represented by Bar No. 3 is applied at 90° in the horizontal plane and +3° in the vertical plane. In the case of Bar No. 4, the force is applied at an angle of 90° in the horizontal plane and −3° in the vertical plane. In the case of Bar No. 5, the force is applied at 90° in the horizontal plane and +4° in the vertical plane. Bar No. 6 represents a force applied at 90° in the horizontal plane and −3° in the vertical plane. Bar No. 7 represents a force at an 80° angle in the horizontal plane and −3° in the vertical plane. Bar No. 8 shows the criterion for a force applied at an angle of 70° in the horizontal plane and −3° in the vertical plane. The corresponding angles for the test represented by Bar No. 9 are 52° and −10°, respectively.

Figure 5A:
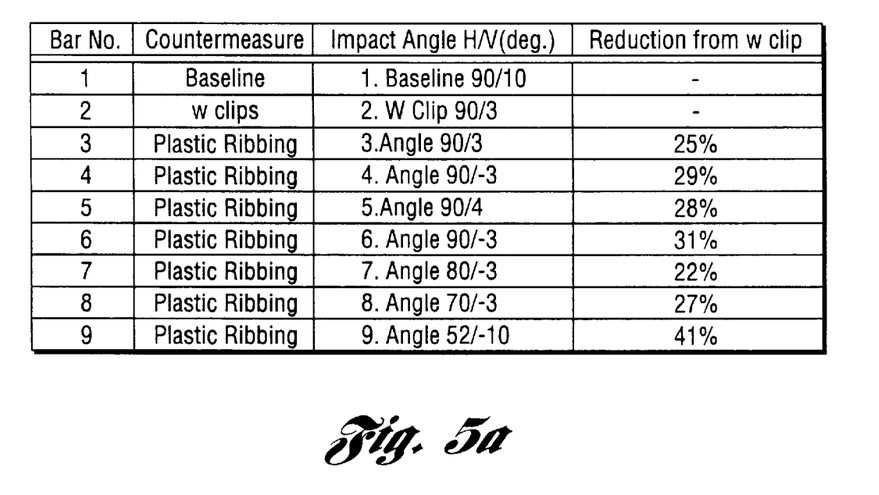
FIG. 5a is a table showing representative data that has been accumulated during development of the chart of FIG. 5.

In FIG. 5a, the percent reduction in the head impact criteria values for the impact forces represented by the bars of FIG. 5, relative to the W-clip value of Bar No. 2, are listed. They vary from 22 percent reduction from the Bar No. 2 value to 41 percent reduction.

Figure 3:
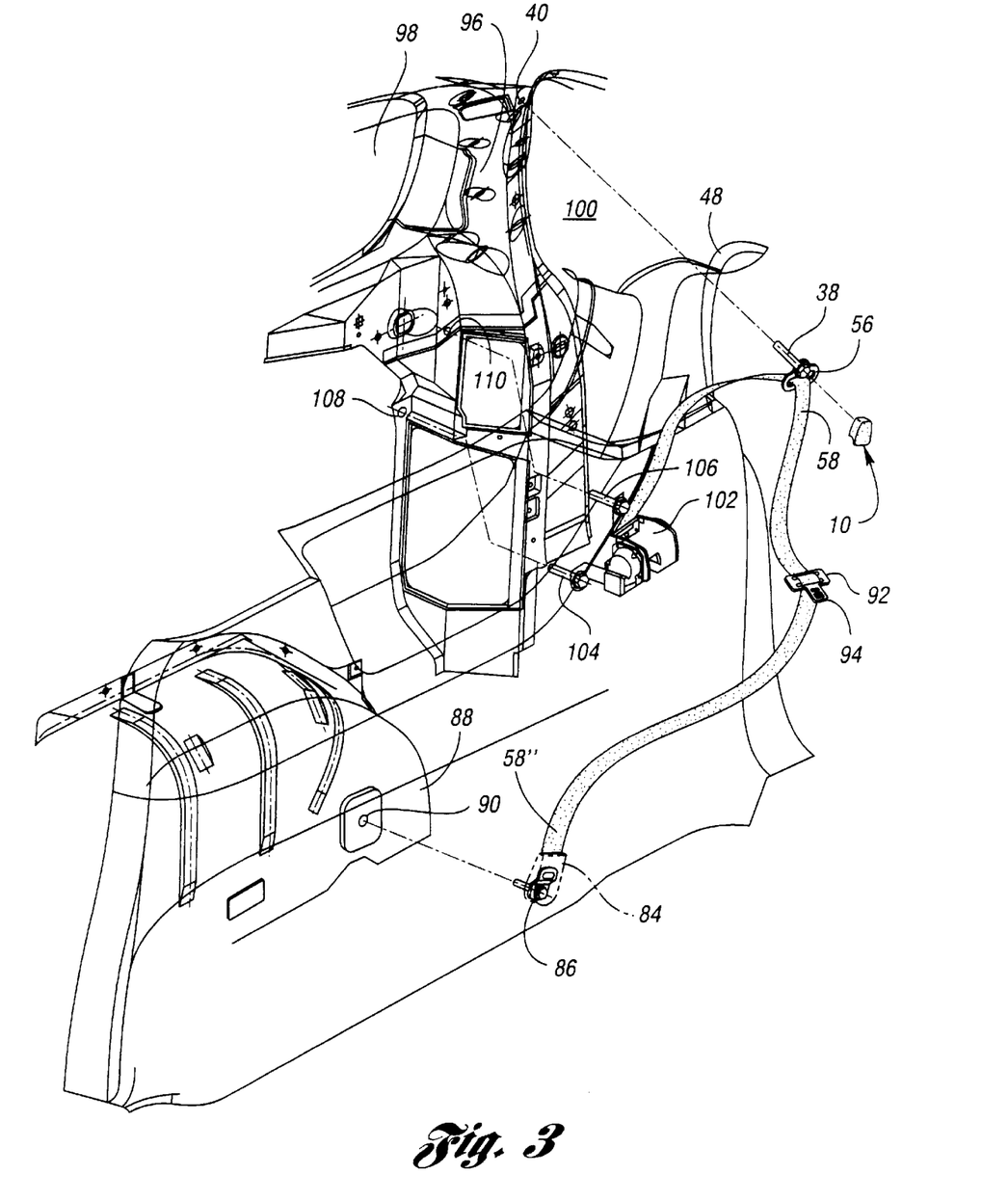
FIG. 3 is an isometric view showing a typical structural side pillar assembly for an automotive vehicle together with a D-ring and floor anchor for a seat belt anchorage capable of providing the improvements of the invention, the elements of the anchorage being shown exploded for purposes of clarity.
Figure 4:
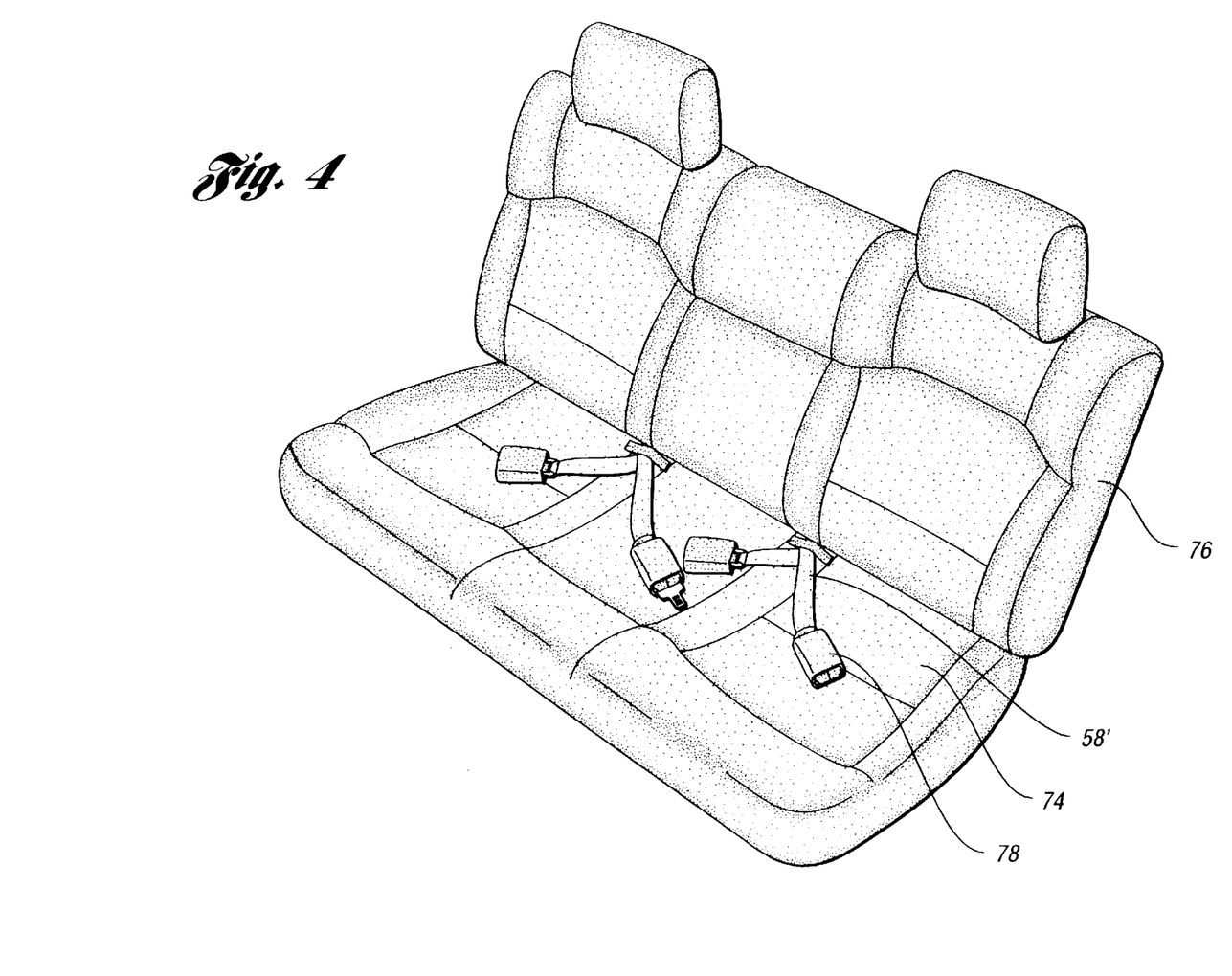
FIG. 4 is an isometric view of a bench seat for an automotive vehicle passenger compartment showing a portion of a typical seat belt anchorage.
Figure 4A:
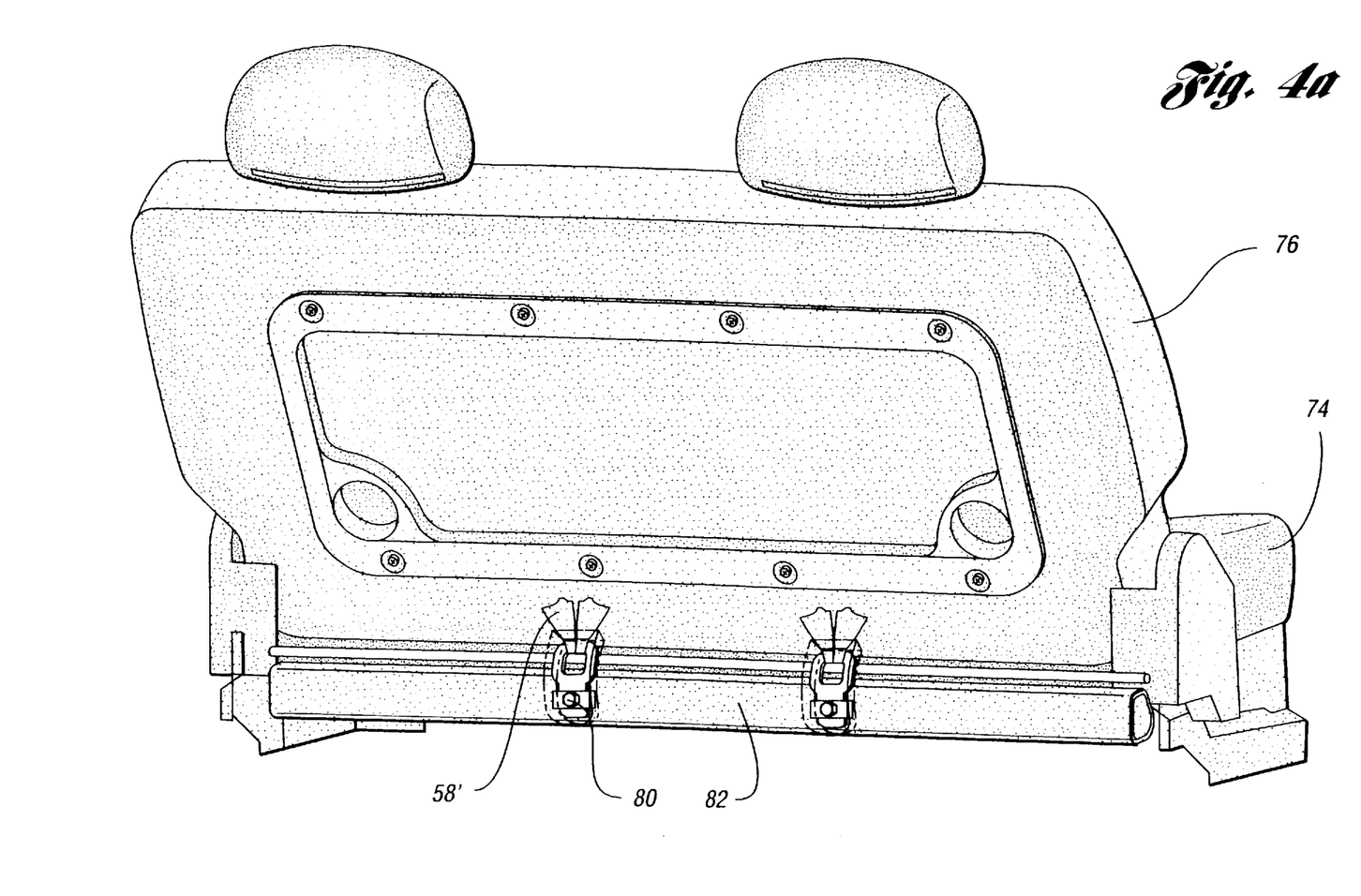
FIG. 4a is a rear view of the bench seat shown in FIG. 4 showing the anchorage attachment for one end of the seat belt.

FIGS. 3, 4 and 4a illustrate the structural environment for the invention. FIG. 4 shows in three-quarter perspective a bench seat that may be installed in a vehicle passenger compartment adjacent a structural center pillar. The lower portion of the seat of FIG. 4 is shown at 74, and the seat back portion is shown at 76. The lower seat portion 74 is provided with seat belt openings that receive a seat belt portion 58'. A seat belt fastener buckle 78 of well known construction is located at one end of the seat belt portion 58'. The other end of seat belt portion 58' is seen in FIG. 4a, which is a rear view of the bench seat of FIG. 4. Seat belt portion 58' is secured to a seat belt anchor bolt 80, which is connected to the structural cross-member 82 that forms a part of the floor pan structure of the vehicle compartment.

FIG. 3 shows at 58" the opposite end of the seat belt 58. A lower anchor plate 84 is used to connect the seat belt at 58" to an anchor bolt 86, which is secured threadably to a structural wheel housing of the vehicle body, as seen at 88. The connection between the bolt 86 and the wheel housing is at location 90 in FIG. 3.

A seat belt buckle member 92, as seen in FIG. 3, has openings through which an intermediate portion of the seat belt 58 is trained. The buckle portion 92 has an extension 94 that is received in the buckle 78 described with reference to FIG. 4.

Shown also in FIG. 3 is the garnish panel 48 through which the anchor bolt 38 extends as it is attached to the inner side panel 40 of the structural side pillar.

The side panel 40 includes a channel member 96 which surrounds a rear window opening 98. The front door opening for the vehicle passenger compartment is shown at FIG. 3 at 100.

A seat belt retractor mechanism 102 is secured to the lower portion of the side pillar channel member at 96 by bolts 104 and 106. These are secured to the side panel at locations 108 and 110, respectively.

The prior art W-clip design of FIG. 9 includes a plastic shroud that covers a seat belt anchor bolt. It has a W-clip secured to the inner wall of the shroud at points 112 and 114. The legs of the W-clip engage the head of an anchor bolt at points 116 and 118. The shroud itself is shown at 120.

When the protective cover of the design of FIG. 9 is subjected to a high-energy axial force, the legs of the W-clip will spread apart, thereby absorbing the peak energy force. No provision is made for absorbing off-center loads. The design of FIG. 9 is described and illustrated merely to demonstrate a contrast between a known device and the present invention.

Although a particular embodiment of the invention has been disclosed, modifications may be made by persons skilled in the art without departing from the scope of the invention. The following claims are intended to cover all such modifications as well as equivalents thereof.

What is claimed is:

1. A seat belt anchor assembly for use in a vehicle passenger compartment having a side pillar that forms a structural part of a vehicle body, comprising:

an anchor bolt secured to said side pillar, said bolt having a bolt head on a bolt axis extending toward the interior of said passenger compartment, a seat belt D-ring supported by said anchor bolt, a passenger restraining seat belt trained through said D-ring thereby forming one anchor point of a three-point restraint;

a protective cover surrounding said anchor bolt comprising a cover housing, a first circular rib within said cover housing and engaging said bolt head, a second circular rib surrounding said bolt head and said first circular rib, said second circular rib being engageable with said D-ring;

a pair of first radial ribs extending between said second circular rib and said housing, said first radial ribs being disposed generally on a horizontal plane containing said bolt axis on opposite sides of said second circular rib; and a pair of second radial ribs extending between said first and second circular ribs, each of said second radial ribs being located generally on a plane between a vertical plane and a horizontal plane containing said bolt axis whereby off-center high energy impact loads are absorbed as said ribs are crushed.

2. The seat belt anchor assembly as set forth in claim 1 including a closure wall located on one side of said cover housing adjacent said D-ring, said closure wall having an opening that receives said anchor bolt, said housing, said ribs and said closure wall forming a unitary molding.

3. The seat belt anchor assembly as set forth in claim 2 including a garnishment panel between said housing and said side pillar, said housing being engageable with said garnishment panel as high energy impact loads are transmitted through said protective cover to said side pillar.

4. The seat belt anchor assembly as set forth in claim 1 including a garnishment panel between said housing and said side pillar, said housing being engageable with said garnishment panel as high energy impact loads are transmitted through said protective cover to said side pillar.

5. The seat belt anchor assembly as set forth in claim 1 wherein said second radial ribs are disposed in angularly spaced planes containing said bolt axis, said angularly spaced planes being displaced at an angle of approximately 45° from said horizontal plane.

* * * * *